(12) United States Patent
Jiang et al.

(10) Patent No.: US 8,738,334 B2
(45) Date of Patent: May 27, 2014

(54) ANOMALY DETECTION, FORECASTING AND ROOT CAUSE ANALYSIS OF ENERGY CONSUMPTION FOR A PORTFOLIO OF BUILDINGS USING MULTI-STEP STATISTICAL MODELING

(75) Inventors: Huijing Jiang, White Plains, NY (US); Young Min Lee, Old Westbury, NY (US); Fei Liu, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 459 days.

(21) Appl. No.: 13/098,044

(22) Filed: Apr. 29, 2011

(65) Prior Publication Data
US 2012/0278051 A1    Nov. 1, 2012

(51) Int. Cl.
*G06F 17/10* (2006.01)

(52) U.S. Cl.
USPC .......... 703/2; 703/5; 700/291; 700/286; 700/109; 700/295; 702/61; 702/186; 705/30; 705/34

(58) Field of Classification Search
None
See application file for complete search history.

(56) References Cited

U.S. PATENT DOCUMENTS

| | | | |
|---|---|---|---|
| 2009/0112522 A1* | 4/2009 | Rasmussen | 702/186 |
| 2011/0251933 A1* | 10/2011 | Egnor et al. | 705/30 |
| 2011/0257911 A1* | 10/2011 | Drees et al. | 702/61 |
| 2012/0084063 A1* | 4/2012 | Drees et al. | 703/6 |

OTHER PUBLICATIONS

Volkan Ediger, Sertac Akar ARIMA Forecasting of Primary Energy Demand by Fuel in Turkey Energy Policy 35, 2007, pp. 1701-1708.*

* cited by examiner

*Primary Examiner* — Omar Fernandez Rivas
*Assistant Examiner* — Cuong Luu
(74) *Attorney, Agent, or Firm* — Scully, Scott, Murphy & Presser, P.C.; Daniel P. Morris, Esq.

(57) ABSTRACT

Multi-step statistical modeling in one embodiment of the present disclosure enables anomaly detection, forecasting and/or root cause analysis of the energy consumption for a portfolio of buildings using multi-step statistical modeling. In one aspect, energy consumption data associated with a building, building characteristic data associated with the building, building operation and activities data associated with the building, and weather data are used to generate a variable based degree model. A base load factor, a heating coefficient and a cooling coefficient associated with the building and an error term are determined from the variable based degree model and used to generate a plurality of multivariate regression models. A time series model is generated for the error term to model seasonal factors which reflect monthly dependence on energy use and an auto-regressive integrated moving average model (ARIMA) which reflects temporal dependent patterns of the energy use.

22 Claims, 6 Drawing Sheets

ANOMALY DETECTION TABLE

| TIME | ACTUAL USAGE | PREDICTED | UPPER BOUND | LOWER BOUND |
|---|---|---|---|---|
| AUG 2005 | 280,160 | 318,769 | 352,964 | 284,708 |
| OCT 2007 | 359,040 | 323,996 | 358,190 | 289,935 |

FUTURE USAGE FORECAST TABLE

| TIME | PREDICTED | UPPER BOUND | LOWER BOUND |
|---|---|---|---|
| NOV 2009 | 378,147 | 412,274 | 344,019 |
| ... | ... | ... | ... |
| OCT 2010 | 329,187 | 363,314 | 295,059 |

ANOMALY DETECTION, FORECASTING AND ROOT CAUSE ANALYSIS OF ENERGY CONSUMPTION FOR A PORTFOLIO OF BUILDINGS USING MULTI-STEP STATISTICAL MODELING

FIELD

The present application relates generally to energy consumption in buildings and more particularly to anomaly detection, forecasting and root cause analysis of energy consumption for a portfolio of buildings using multi-step statistical modeling.

BACKGROUND

Saving energy, improving energy efficiency of energy consumption and reducing greenhouse gas (GHG) emissions are key initiatives in many cities and municipalities and for building owners and operators. Inventors in this disclosure have recognized that in order to reduce energy consumption in buildings, one should understand patterns of energy usage, characteristics of building structures, operations and occupant behaviors that influence energy consumption. However, building structures often have different characteristics, for instance, each being built with unique or different characteristics and designs from one another. Due to such heterogeneity in buildings, analyzing energy consumption in buildings is not an easy or simple task.

BRIEF SUMMARY

A method and system for performing analysis of energy consumption in one or more buildings may be provided. The analysis may include anomaly detection, forecasting or root cause analysis of energy consumption, or combinations thereof, for a portfolio of buildings using multi-step statistical modeling. The method, in one aspect, may include receiving energy consumption data associated with a building, receiving building characteristic data associated with the building, receiving building operation and activities data associated with the building, and receiving weather data. The method may also include fitting said energy consumption data, said building characteristic data, said building operation and activities data, and said weather data to generate a variable based degree model. The method may further include determining a base load factor, a heating coefficient and a cooling coefficient associated with the building and an error term from the variable based degree model. The method may also include generating a plurality of multivariate regression models based on the base load factor, the heating coefficient, the cooling coefficient and the building characteristic data. The method may yet further include generating a time series model for the error term to model seasonal factors which reflect monthly dependence on energy use and an auto-regressive integrated moving average model (ARIMA) which reflects temporal dependent patterns of the energy use. The method may also include generating a performance score associated with energy consumption for base load of the building, a performance score associated with energy consumption for cooling the building, or a performance score associated with energy consumption for heating the building, or combinations thereof, based on the generated variable based degree model and the multivariate regression models.

A system for analyzing energy consumption in one or more buildings may include performing anomaly detection, forecasting or root cause analysis of energy consumption, or combinations thereof, for a portfolio of buildings using multi-step statistical modeling. The system, in one aspect, may include a module operable to receive energy consumption data associated with a building, building characteristic data associated with the building, building operation and activities data associated with the building, and weather data. The module may be further operable to fit said energy consumption data, said building characteristic data, said building operation and activities data, and said weather data to generate a variable based degree model. The module may be further operable to determine a base load factor, a heating coefficient and a cooling coefficient associated with the building and an error term from the variable based degree model. The module may be also operable to generate a plurality of multivariate regression models based on the base load factor, the heating coefficient, the cooling coefficient and the building characteristic data. The module may be further operable to generate a time series model for the error term to model seasonal factors which reflect monthly dependence on energy use and an auto-regressive integrated moving average model (ARIMA) which reflects temporal dependent patterns of the energy use. The module may be further operable to generate a performance score associated with energy consumption for base load of the building, a performance score associated with energy consumption for cooling the building, or a performance score associated with energy consumption for heating the building, or combinations thereof, based on the generated variable based degree model and the multivariate regression models.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 4A shows anomaly detection table in one embodiment of the present disclosure.

FIG. 4B shows future usage forecast table in one embodiment of the present disclosure.

DETAILED DESCRIPTION

Energy consumption analysis in buildings employing multi-step statistical modeling is presented. The analysis in one embodiment may provide anomaly detection, forecasting, and root cause analysis of energy consumption for a portfolio of buildings. To manage and to be able to reduce overall energy consumed in a building or a portfolio of buildings, a methodology in one embodiment of the present disclosure studies the energy consumption in finer grain: for example, how much energy is consumed for different types of usage such as for heating, cooling, and other non-temperature dependent usage (referred to herein as base loads) such as for lighting, hot water, refrigerator, and others. The methodology in one embodiment also evaluates building energy performance for different types of usage such as for heating, cooling, based loads, and overall energy use. In one aspect, different factors such as building characteristics and operations that contribute to energy consumption are taken into account in the analysis, incorporating temporal and seasonal trends of energy consumption. Examples of building characteristics and operations may include, but are not limited to, age of the building being analyzed, gross floor area (GFA) of the building, the number of occupants in the building, operating hours of the building, the number of equipments such as computers and appliances in the building. In one aspect, temporal and seasonal trends of energy consumption may be evaluated based on the patterns of energy consumption employing heating degree day (HDD) and cooling degree day (CDD) factors.

A base temperature is associated with a building, which may depend on the characteristics of the building. For instance, a heater is not turned on to heat the building if the outside temperature is above the base temperature. Similarly, an air conditioner is not turned on to cool the building if the outside temperature is below the base temperature. HDD refers to the cumulative difference in a specific month between the outside air temperature and the base temperature, if the outside air temperature is above the base temperature. CDD refers to the cumulative difference in a specific month between the outside air temperature and the base temperature, if the outside air temperature is below the base temperature.

Figure 1:
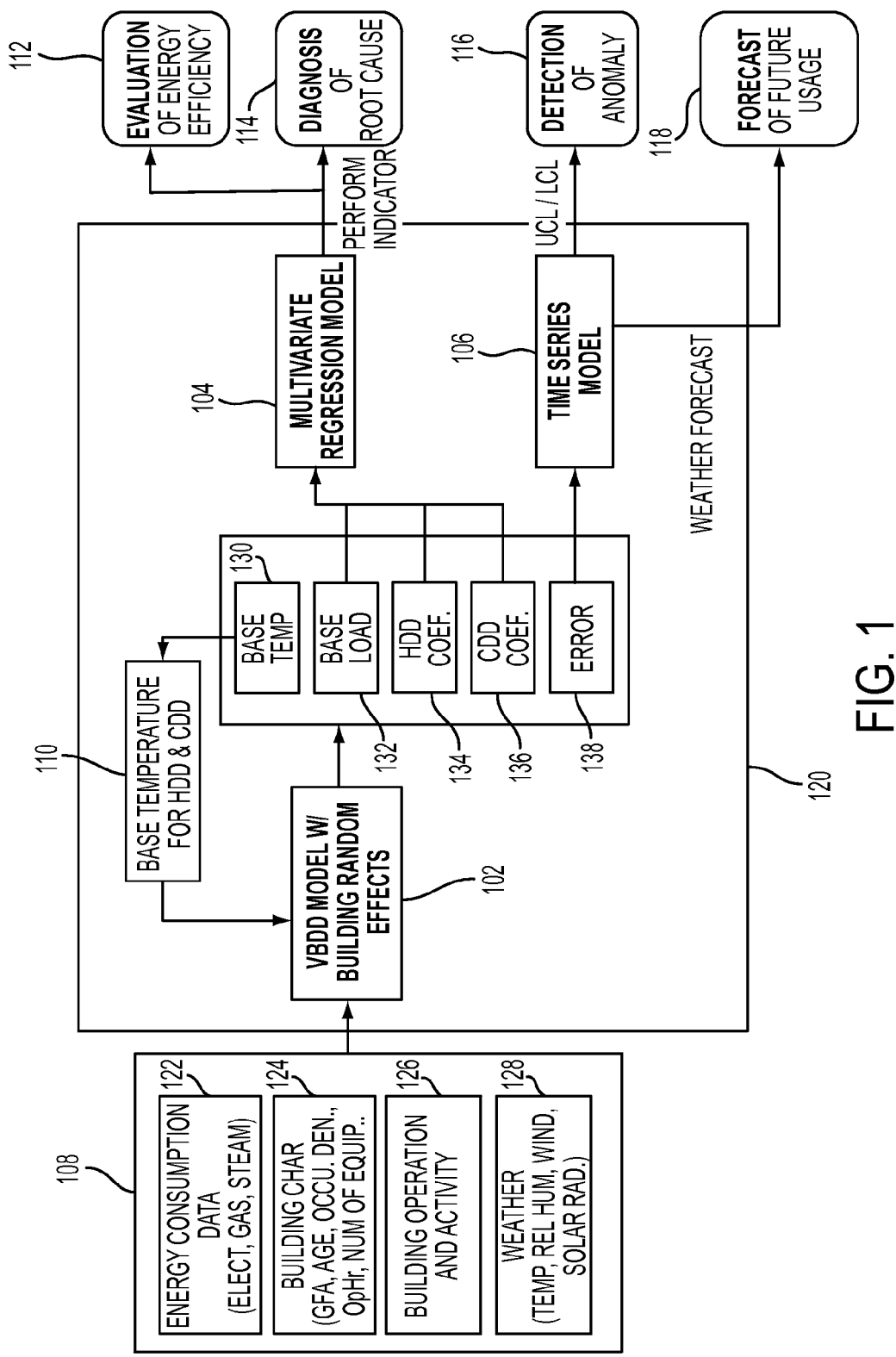
FIG. 1 is a diagram illustrating functional components of the present disclosure in one embodiment.

In one embodiment of the present disclosure, multi-step statistical model is developed and integrated for performing the energy consumption analysis in one or more buildings. The energy consumption analysis as described above may include energy efficiency evaluation, root cause analysis that determines high amount of energy consumption, anomaly detection, and forecast of future usage. FIG. 1 is a diagram illustrating functional components that provide multi-step statistical modeling of the present disclosure in one embodiment. The multi-step statistical modeling in one embodiment may include developing a variable base degree day (VBDD) model 102 with building effects, developing a multivariate regression model 104, and developing a time series model 106 with seasonality, e.g., HDD (heating degree day) and CDD (cooling degree day) adjustments. Seasonality refers to factors that depend on different seasons, for example, snow days or the like that cause building closings, which may account for the irregularity (e.g., outside of normal usage amount) in energy use in the building. The methodology of the present disclosure in one embodiment may integrate those developed models 102, 104, 106 to provide energy efficiency evaluation 112, root cause analysis 114, anomaly detection 116, and forecast of future energy usage 118.

VBDD model 102 of the present disclosure in one embodiment describes energy usage specific to a building, for example, incorporating unique or different characteristics attributed to each building. The model parameters may vary for different buildings, for instance, because different buildings have different characteristics and are operated differently and thus consume different amount of energy. This is referred to as building effects. In the present disclosure, building effects are quantified or expressed as parameter coefficients. Each building may be associated with different coefficients for base load, heating and cooling. In one embodiment, the VBDD model 102 may be defined as:

$$y_{it} = b_i + c_i(T_t - T_i^0)^+ + h_i(T_i^0 - T_t)^+ + \epsilon_{it}$$

where, i represents building index and t represents time period index (e.g., period of time such as month duration);

$y_{it}$ is the energy consumption for building i during time period t (e.g., over a month time period);

$b_i$ is a coefficient representing the base load for building i;

$T_t$ is the outside temperature during time period t (e.g., average over a month) and $T_i^0$ is the building specific base temperature for building i;

$c_i$, $h_i$ are coefficients for cooling and heating of building i, respectively, $\epsilon_{it}$ is the error term that represents unaccountable energy consumption in building i during time period t.

The term $(T_t - T_i^0)^+$ above is defined to be a positive number when $T_t > T_i^0$, and zero when $T_t \leq T_i^0$. Similarly, the term $(T_i^0 - T_t)^+$ above is defined to be a positive number when $T_i^0 > T_t$, and zero when $T_i^0 \leq T_t$.

The VBDD model 102 describes energy consumed in a building in terms of the energy consumed for its base load, for cooling as a function of the outside temperature and the building specific base temperature, and for heating as a function of the outside temperature and the building specific base temperature. A VBDD model is built for each energy type. The VBDD model 102 in one embodiment is a regression model built using data 108 collected about the building. Such data may include energy consumption data 122, building characteristics data 124, building operation and activity data 126, and weather data 128. Examples of energy consumption data 122 may include, but are not limited to, data showing how much electricity was consume, how much gas was consumed, how much steam was consumed, for instance, in a given period of time, and others. Examples of building characteristics data 124 may include, but are not limited to, GFA, age of the building and its equipment, occupancy related data, operating hours, number of equipment, and others conditions of the building corresponding to the time period of the energy consumption data. Examples of building operation and activity data 126 may include, but are not limited to, data describing how the building is operated and the activities performed in the building corresponding to the time period of the energy consumption data, for instance, operating hours of a building and whether a building is open during weekends, and others information about the building operation and activities. Examples of weather data 128 may include, but are not limited to, data about the weather (e.g., temperature, relative humidity, wind factor, whether sunny or cloudy) during the period of time corresponding to the energy consumption data. The data 108 is fitted to a line or curve that forms a VBDD model.

The methodology of the present disclosure in one embodiment builds a VBDD model 102 using the input data 108 associated with a building, and obtains from the built VBDD model 102, a building effect for base load 132, building effects for cooling coefficient 136 and heating coefficient 134. The VBDD model 102 also may produce an error term 138, which represents the energy consumption in the building not attributed to the base load, heating or cooling energy in the building.

In one embodiment of the present disclosure, the VBDD model 102 is built by using variable base temperature 110 for HDD and CDD. Take for example, a building (building i) with base temperature $(T_i^0)$ 130. In constructing the VBDD model 102, the methodology of the present disclosure in one embodiment may try different variations of, or a range of temperatures, for instance, that includes the base temperature. For example, a range between 60 to 70 degrees Fahrenheit may be used as the base temperature to try different VBDD models. Then a model with the best fit (e.g., the largest $R^2$ value (R-squared value)) may be selected for use. For example, if the VBDD model with base temperature being equal to 65 degrees Fahrenheit has the largest $R^2$, we will estimate the base temperature for the building as 65 degrees Fahrenheit and utilize this VBDD model for subsequent analysis, A methodology of the present disclosure takes as input the base load 132, HDD coefficient 134 and CDD coefficient 136 determined in the VBDD model, and builds a plurality of multivariate regression models 104. Multivariate regression models 104 may include a regression model that describes a base load of a building based on its building characteristics and activity data, for instance, expressed as:

$$b_i = \beta_0 + \beta_1 x_{i1} + \beta_2 x_{i2} + \beta_3 x_{i3} + \ldots + e_i$$

Another (or second) regression model of the multivariate regression models 104 may be for the heating coefficients based on building characteristics and activity data, for example, expressed as follows:

$$h_i = \beta_0 + \beta_1 x_{i1} + \beta_2 x_{i2} + \beta_3 x_{i3} + \ldots + e_i$$

Yet another (or third) regression model of the multivariate regression models 104 may be for the cooling coefficients based on building characteristics and activity data, for instance, expressed as follows:

$$c_i = \beta_0 + \beta_1 x_{i1} + \beta_2 x_{i2} + \beta_3 x_{i3} + \ldots + e_i$$

The x values ($x_{i1}, x_{i2}, x_{i3}, \ldots$) represent different variables such as the building characteristics and activity data related to building i. Thus, $x_{i1}$ represent variable 1 for building i. Examples of variables include, but are not limited to, building age, gross floor area, number of floor, number of computers, number of occupants, operating hours, cooking facilities, electricity plug loads, and others. $\beta_0$ represents a constant value that does not depend on the building characteristics or activity. The coefficient $\beta$ for each variable x represents the weight of that variable. For example, $\beta_1$ represents the weight associated with variable 1 ($x_{i1}$). $e_i$ represents an error term for building i.

In one aspect, a stepwise variable selection method may be utilized to select those variables that contribute significantly to base load regression, heating coefficient regression, and cooling coefficient regression. Significance of contribution may be determined by the increase of the adjusted $R^2$. For instance, a variable is considered to contribute significantly if the inclusion of this variable leads to statistical significant increase of the adjusted $R^2$. The stepwise variable selection method, for example, tests different variables one at a time in the regression to determine whether the presence or absence of that variable makes a difference or contributes to the regression.

The methodology of the present disclosure in one embodiment also builds a time series model 106 for the error term 138. The time series model 106, in one embodiment, models the seasonal and temporal dependence structure. The seasonal factors can be estimated through a regression model, where the response variable is the error term 138 and the predictor variables are the associated indicator variables for each month. The seasonal regression model may take the following form in one embodiment, $$\varepsilon_{it} = \sum_{k=1}^{12} s_{ik} \delta(M(t) = k) + \varsigma_{it}$$

where $s_{ik}$ is the $k^{th}$ seasonal factor, $M(t)$ is the corresponding month of time t, and $\delta(M(t)=k)$ is the Dirac function, which takes value 1 if $M(t)=k$ and 0 otherwise. $\varsigma_{it}$ represents the residual of the error term (remaining after the seasonal factors are removed). After removing the resultant seasonal factors from $\epsilon_{ik}$, we further model the residuals via the autoregressive integrated moving average model (ARIMA), $$\left(1 - \sum_{k}^{p} \phi_{ik} L^k\right)(1-L)^d \varsigma_{it} = \left(1 + \sum_{k=1}^{q} \theta_{ik} L^k\right)\eta_{it}$$

where,
$\varsigma_{it}$ is the residual of the error term;
i is an index that represents a building;
k is an index that represents the number of lags;
L is the lag operator;
p, d, q are orders of the autoregressive, integrated, and moving average parts of the model;
p, q reflect the strength of temporal dependence, and d reflects the type of trend (e.g., d=0 no trend, d=1 linear trend);
$\{\phi_{ik}, \theta_{ik}\}$ are parameters of the auto-regressive part and the moving average part of the ARIMA model, respectively;
$\{\eta_{it}\}$ are independently identically normally distributed.
The methodology of the present disclosure in one embodiment selects p, d, q based on Bayesian Information Criterion (BIC).

In one embodiment of the present disclosure, the VBDD and multivariate regression models of a building may enable evaluation of energy efficiency 112 in the corresponding building and diagnosis of root cause 114 in the corresponding building. For example, to evaluate energy efficiency of a building, the methodology of the present disclosure may rank the building performance based on the results of the building random effects VBDD model and the multivariate regression models. For instance, the performance score for base load may be expressed as:

$$1 - \Phi[(b_i - \hat{b}_i)/\hat{\sigma}_b]$$

where, $\Phi$ is cumulative distribution function of the standard normal distribution, $\hat{\sigma}_b$ is the standard error, $\hat{b}_i$ is the predicted base load for building i according to the multivariate regression model, and $b_i$ is the base load for building i according to the VBDD model.

Performance score for heating usage may be expressed as:

$$1 - \Phi[(h_i - \hat{h}_i)/\hat{\sigma}_h]$$

where, $\Phi$ is cumulative distribution function of the standard normal distribution, $\hat{\sigma}_b$ is the standard error, $\hat{h}_i$ is the predicted heating coefficient for building i according to the multivariate regression model, and $h_i$ is the heating coefficient for building i according to the VBDD model. Performance score for cooling usage may be expressed:

$$1 - \Phi[(c_i - \hat{c}_i)/\hat{\sigma}_c]$$

where, $\Phi$ is cumulative distribution function of the standard normal distribution, $\hat{\sigma}_c$ is the standard error, $\hat{c}_i$ is the predicted cooling coefficient for building i according to the multivariate regression model, and $c_i$ is the cooling coefficient for building i according to the VBDD model.

The score values are expressed as a range between 0 and 1, 0 being the lowest performance score and 1 being the highest performance score.

Figure 2A:
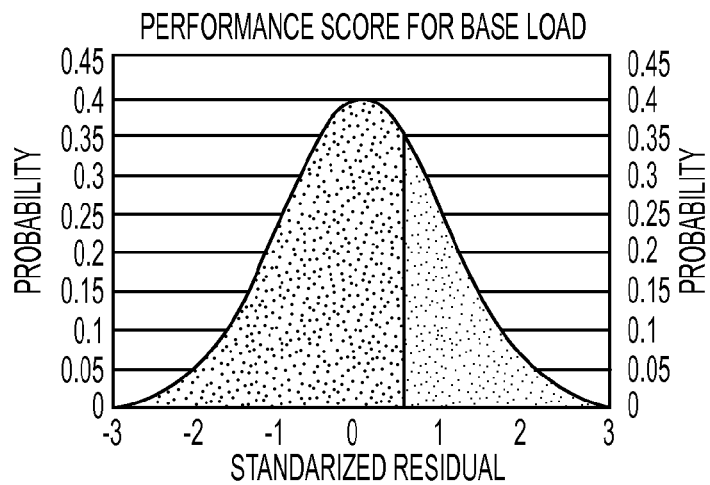
FIGS. 2A-2C illustrate root cause analysis that may be performed with the performance scores of the present disclosure in one embodiment.
Figure 2B:
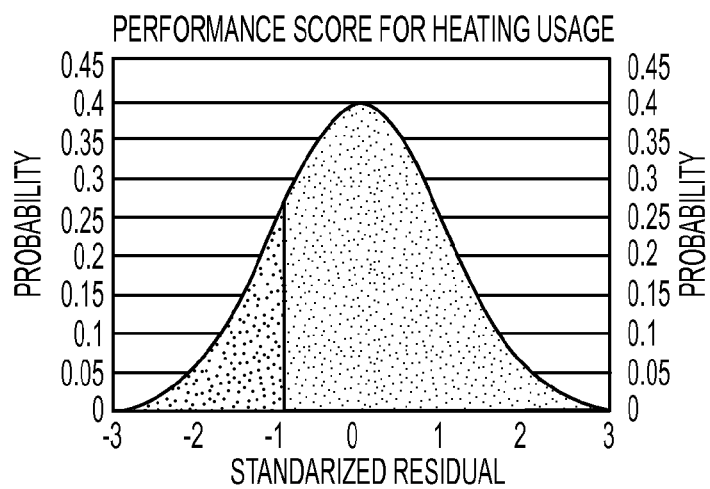
Figure 2C:
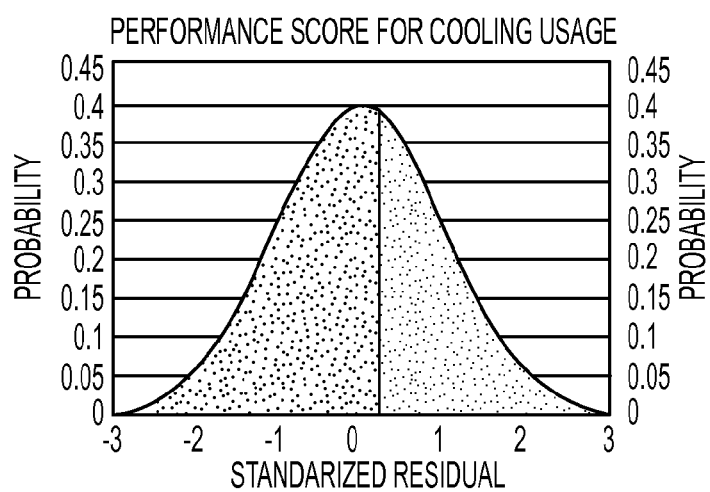

In addition, a root cause analysis may be performed based on the above-computed performance scores. FIGS. 2A-2C illustrate root cause analysis that may be performed with the performance scores, for example, whether this building (i) uses too much energy for base load, cooling or heating. In FIG. 2A, the performance score for base load shows that this building uses much energy for base load, in comparison to the peer buildings throughout the building portfolio, as indicated by the dark shaded area under the curve. FIG. 2B shows that heating performance is relatively good. FIG. 2C shows that the building has a moderate cooling performance comparing to the peer buildings in the building portfolio. The root cause for building energy inefficiency is likely to be due to the high base load consumption, and a recommendation to further investigate the base load related energy systems may follow while retrofitting the building.

Figure 3:
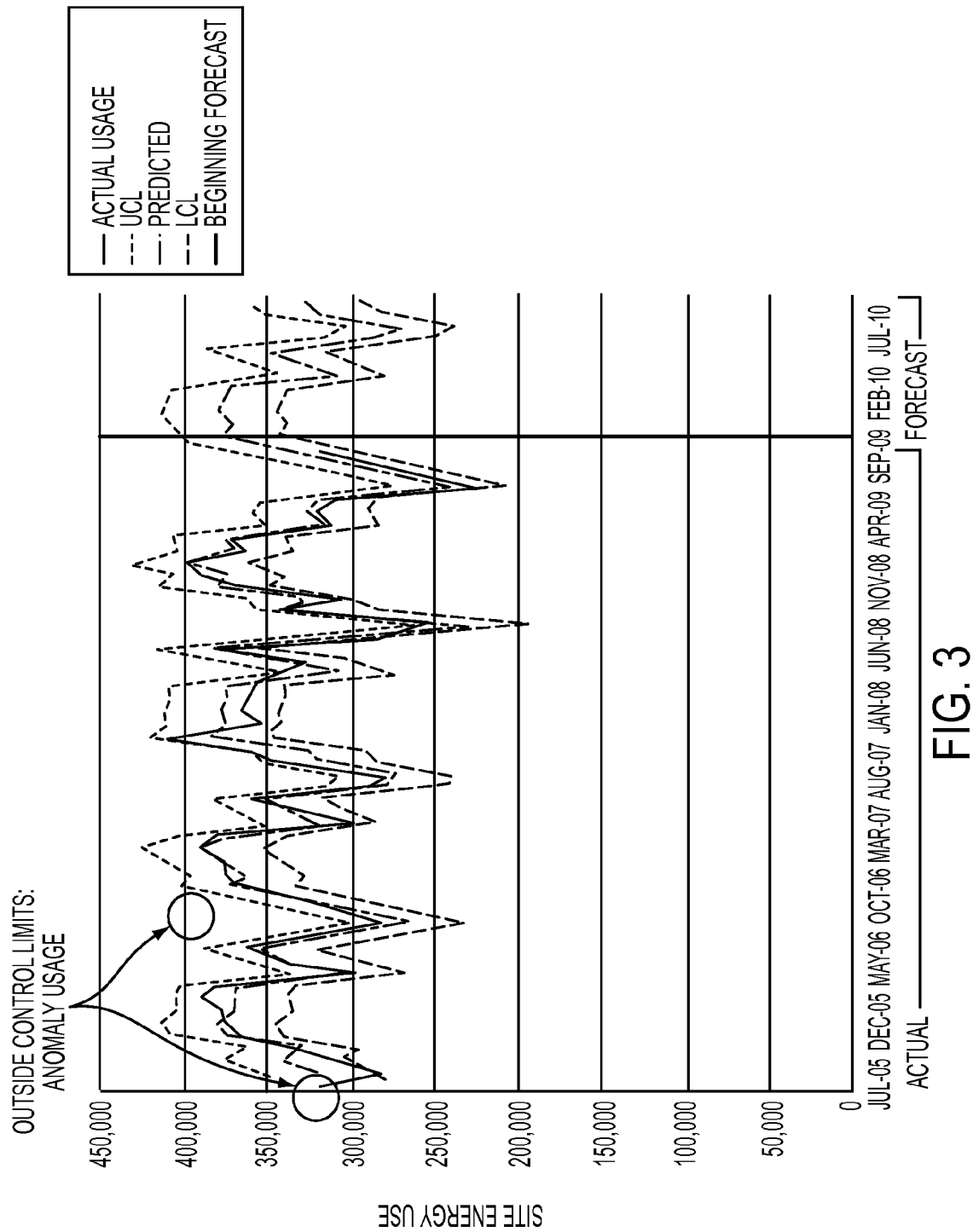
FIG. 3 illustrates a graph that shows both the predicted usage and actual usage plotted with upper and lower bounds.

The methodology of the present disclosure in one embodiment employs the time series model 106, and derives the upper control limit (UCL) and lower control limit (LCL), which can be used for anomaly detection. Specifically, for example, a 95% confidence interval can be constructed at each time point based on the ARIMA model. The UCL is thus obtained as the collection of the upper end points of the 95% confidence intervals and the LCL is the collection of the lower end points of the 95% confidence intervals. The methodology of the present disclosure detects the occurrence of an abnormal consumption by detecting that the actual energy usage that is outside the control limits. This may be done, for example, by first adding the predictions from the VDBB model, seasonal factors and ARIMA models to obtain the predicted usage for a time point (along with the UCL and LCL), then comparing the actual usage with the control bounds of the predicted usage. FIG. 3 illustrates a graph that shows both the predicted usage and actual usage plotted with upper and lower bounds. The x-axis is the time of usage and the y-axis is the building (site)'s energy usage. In the example shown in FIG. 3, it can be seen that energy uses at 302 and 304 are outside the bounds. For example, the energy use at 302 is below the lower control bound while the energy use at 304 is above the upper control bound. These are identified as the abnormal energy use. The abnormal energy uses below the lower control bound suggest some energy saving behaviors. It would be of interest to investigate such behaviors and carry out the behaviors in the future. On the other hand, abnormal energy uses above the upper control bounds indicate energy waste and require further investigation. Based on the investigation, wasteful usage may be avoided or reduced.

FIG. 4A shows anomaly detection table. Predicted usage 404 is shown for a time period 410 with upper 406 and lower 408 bounds. Actual usage 402 during that period 410 is also shown.

The methodology of the present disclosure may further forecast future energy usage using available weather forecast data. For instance, since the coefficients have been determined in the VBDD model, it is possible to use the model to forecast the future usage. The forecasted future use of energy is obtained as follows in one embodiment of the present disclosure. Firstly, the heating energy use is forecasted by multiplying the heating coefficient (obtained from the VBDD model) with the forecasted HDD. Secondly, the cooling energy use is forecasted by multiplying the cooling coefficient (obtained from the VBDD model) with the forecasted CDD. Thirdly, other energy use is forecasted according to the forecast error terms using the ARIMA model. The above steps need not be performed in any particular order. Finally, adding the heating energy use, cooling energy use, base load obtained from a multivariate regression model for base load, seasonal factors from the past data, and the forecasted error terms together, the future energy use forecast may be obtained.

FIG. 4B shows future usage forecast table. Predicted usage is shown for a time period with upper and lower bounds.

Figure 5:
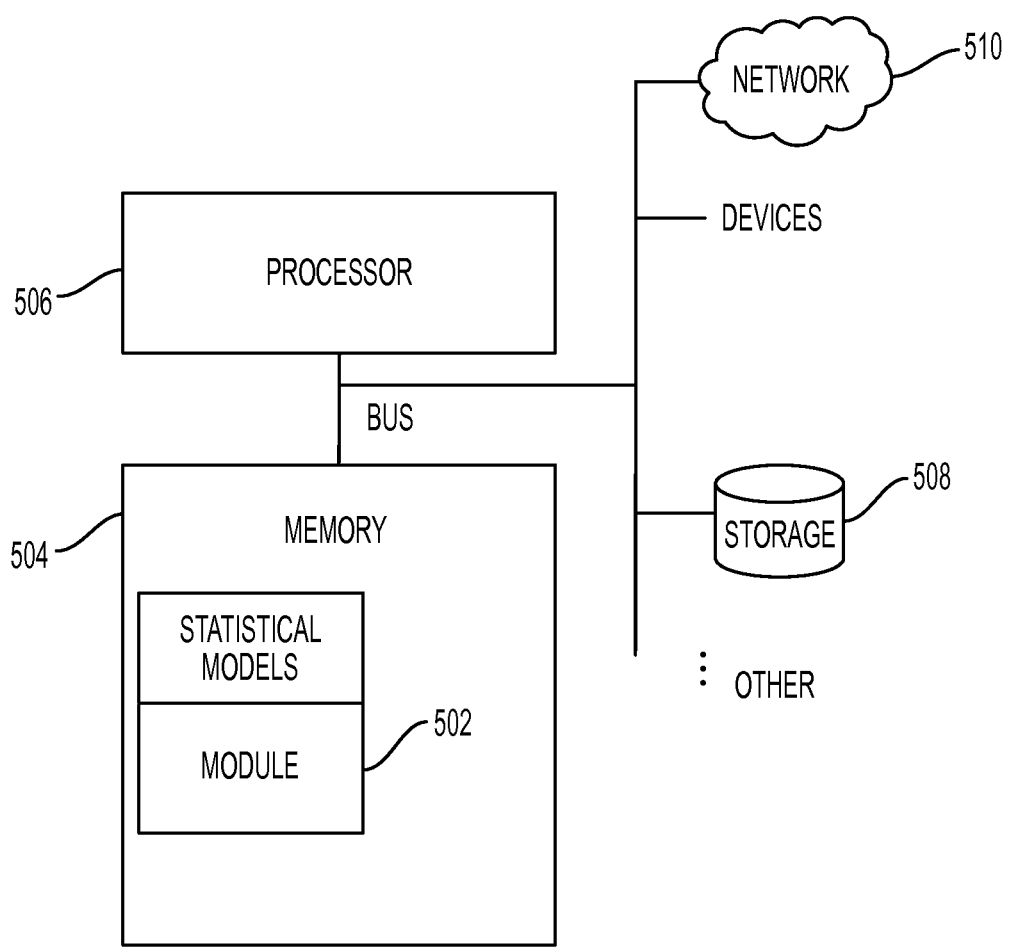
FIG. 5 shows system components in one embodiment of the present disclosure that may run or implement the methodologies of the present disclosure.

FIG. 5 shows system components in one embodiment of the present disclosure that may run or implement the methodologies of the present disclosure. The methodology of the present disclosure may be implemented or run in a computing environment, for example, having the statistical models as described above. A module 502 that may include computer instructions for performing the logic of the methodology which develops and uses the statistical models may be store in memory 504 of the computing system. A processor 506 or the like may execute the instructions of the module 502 to perform the logic of the methodology of the present disclosure as described above. The data used for developing the statistical models may be stored in local storage device 508 or may be stored at a remote storage device and received via a network 510. Any other methods may be used to collect, store and/or receive the data.

Figure 6:
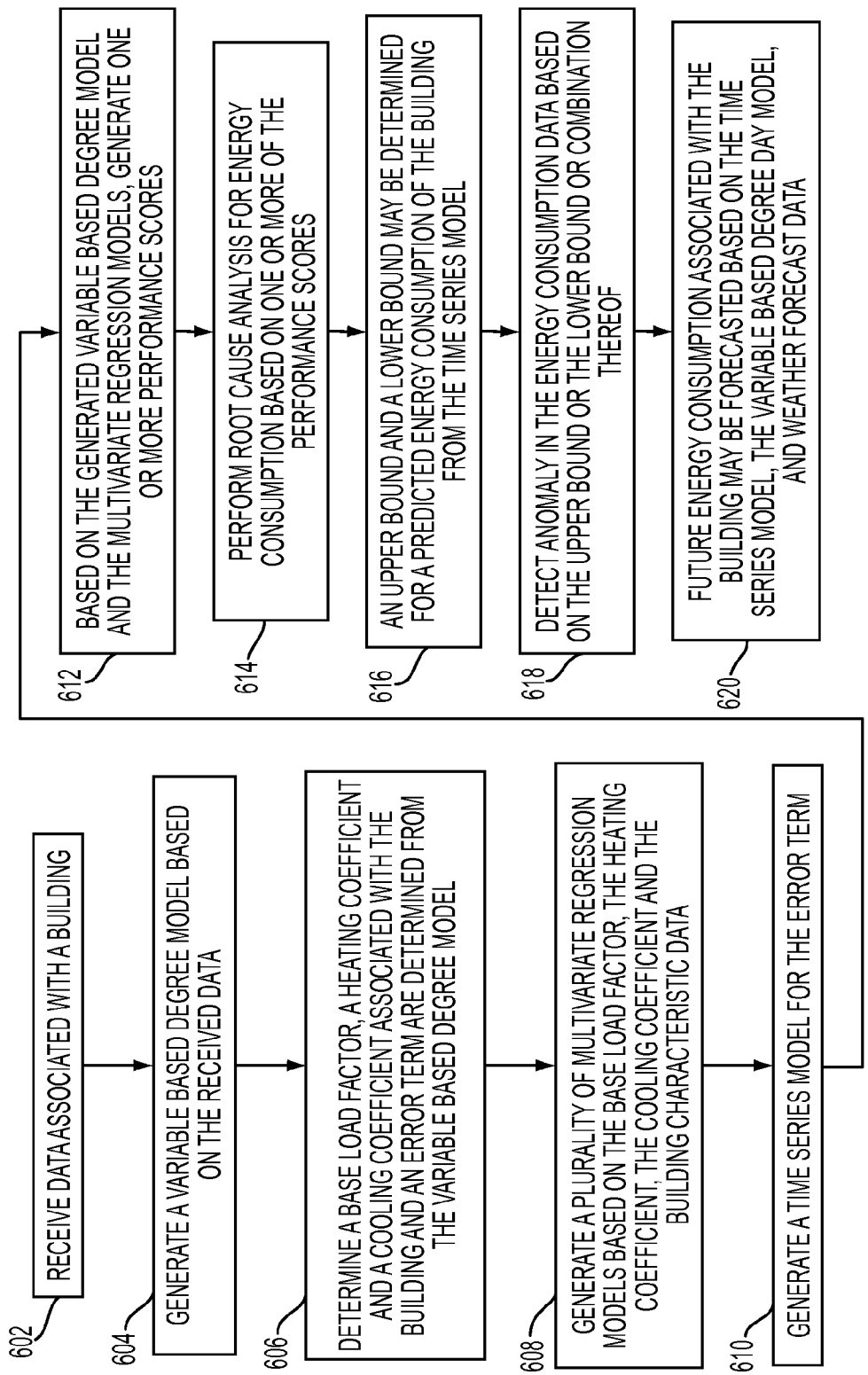
FIG. 6 is a flow diagram illustrating a method of present disclosure in one embodiment.

FIG. 6 is a flow diagram illustrating a method of present disclosure in one embodiment. At 602 data associated with a building is received. The data may include energy consumption data associated with a building, building characteristic data associated with the building, building operation and activities data associated with the building, and weather data. At 604, the received data is used to generate a variable based degree model, for instance, a regression model that describes the energy consumption of the building in a period in terms of base load usage, heating usage and cooling usage. At 606, a base load factor, a heating coefficient and a cooling coefficient associated with the building and an error term are determined from the variable based degree model. In one embodiment of the present disclosure, the step at 604 may be performed multiple times iteratively with a varying base building temperature data in each iteration, wherein a plurality of variable base degree models are generated for the building, and wherein the variable base degree model having the best fit is selected for determining the base load factor, the heating coefficient and the cooling coefficient associated with the building.

At 608, a plurality of multivariate regression models is generated based on the base load factor, the heating coefficient, the cooling coefficient and the building characteristic data. The multivariate models include a regression model that expresses or describes the base load energy consumption in terms of the building characteristics, a regression model that expresses or describes the heating coefficient in terms of the building characteristic and activity, and a regression model that expresses or describes the cooling coefficient in terms of the building characteristics. At 610, a time series model is generated for the error term to model seasonal factors which reflect monthly dependence on energy use and an auto-regressive integrated moving average model (ARIMA) which reflect temporal dependent patterns of the energy use.

At 612, based on the generated variable based degree model and the multivariate regression models, one or more of, or any combinations of, a performance score associated with energy consumption for base load of the building, a performance score associated with energy consumption for cooling the building, or a performance score associated with energy consumption for heating the building may be generated.

At 614, root cause may be analyzed for energy consumption based on one or more of the performance score associated with energy consumption for base load of the building, the performance score associated with energy consumption for cooling the building, or the performance score associated with energy consumption for heating the building, or combinations thereof.

At 616, an upper bound and a lower bound may be determined for a predicted energy consumption of the building from the time series model. At 618, an anomaly in the energy consumption data may be detected based on the upper bound or the lower bound or combination thereof. At 620, future energy consumption associated with the building may be forecasted based on the time series model, the variable based degree day model, and weather forecast data.

The above-described models may be developed per building, for many buildings. Thus, each building may have a set of models that are built according to the building's unique characteristics and operating parameters. A building may be any construction including a roof and walls. Examples of building may include but are not limited to a school building, an office building, a residential building, a government building, a hospital building, and others.

The methodology of the present disclosure in one embodiment incorporates building heterogeneity and the dependent error structure, for example, for analyses of a large portfolio of buildings. In the present disclosure, we develop a statistical analysis procedure, which combines VBDD regression model and the Auto Regressive Integrated Moving Average (ARIMA) model, for instance, as an effort to assess energy usage and identify energy saving opportunities for large portfolios of buildings. In one embodiment, to accommodate building heterogeneity, we first build the VBDD regression models separately for each building. These models are used to separate the base load energy consumption from the weather dependent usage. The results in this step may include the base temperature estimates, as well as the estimated coefficients for HDD and CDD for all buildings. We then estimate the seasonal factors through a multivariate regression model and further model the dependent error structure after adjusting for seasonal factors through the ARIMA model. Compared to the VBDD regression model, the ARIMA models provide better forecast for future energy consumption.

The proposed technique provides an integrated analysis for building heterogeneity, the weather dependent patterns and the temporal dependent patterns. It shows improved statistical performance compared to the method based on VBDD alone. We apply the proposed method to detect anomaly and forecast future energy consumption for a portfolio of buildings.

In the present disclosure, data associated with a building is collected over a period of time and used to develop multi-step statistical modeling. The multi-step statistical models of the present disclosure enable one to better manage and reduce energy consumption in buildings, by for example, informing how much energy is consumed for different types of usage such as heating, cooling, base loads (lighting, hot water, refrigerator, and other); how to evaluate building energy performance for different types of usage; what are the factors (building characteristics and operations) that contribute to energy consumption such as age of building, gross flow area (GFA), number of floors, number of occupants, operating hours, number of computers and appliances; and how to incorporate temporal and seasonal trends of energy consumption.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of performing analysis of energy consumption for a portfolio of buildings using multi-step statistical modeling, comprising:
   receiving energy consumption data associated with a building;
   receiving building characteristic data associated with the building;
   receiving building operation and activities data associated with the building;
   receiving weather data;
   fitting said energy consumption data, said building characteristic data, said building operation and activities data, and said weather data to generate a variable based degree day model;
   determining, by a computer processor, a base load factor, a heating coefficient and a cooling coefficient associated with the building and an error term from the variable based degree day model;
   generating a plurality of multivariate regression models based on the base load factor, the heating coefficient, the cooling coefficient and the building characteristic data;
   generating a time series model for the error term to model seasonal factors which reflect monthly dependence on energy use and an auto-regressive integrated moving average model (ARIMA) which reflects temporal dependent patterns of the energy use;
   generating, by the computer processor, a performance score associated with energy consumption for base load of the building, a performance score associated with energy consumption for cooling the building, or a performance score associated with energy consumption for heating the building, or combinations thereof, based on the generated variable based degree day model and the multivariate regression models, wherein
   the variable based degree day model includes $y_{it} = b_i + c_i(T_t - T_i^0)^+ + h_i(T_i^0 - T_t)^+ + \epsilon_{it}$, wherein i is building index;
   t is time index;
   $y_{it}$ is energy consumption for building i at time t;
   $b_i$ is building effect for base load;
   $T_t$ is outside temperature and $T_i^0$ is building specific base temperature associated with building i;
   $c_i$ is building effects for cooling coefficient;
   $h_i$ is building effects for heating coefficient; and
   $\epsilon_{it}$ is an error term that represents unaccountable energy consumption.

2. The method of claim 1, wherein the step of fitting is performed a plurality of times iteratively with a varying base building temperature data in each iteration, wherein a plurality of variable base degree day models are generated for the building, and wherein the variable base degree day model having the best fit is selected for determining the base load factor, the heating coefficient and the cooling coefficient associated with the building.

3. The method of claim 1, further including analyzing root cause for energy consumption based on one or more of the performance score associated with energy consumption for base load of the building, the performance score associated with energy consumption for cooling the building, or the performance score associated with energy consumption for heating the building, or combinations thereof.

4. The method of claim 1, further including determining an upper bound and a lower bound for a predicted energy consumption of the building from the time series model.

5. The method of claim 4, further including detecting an anomaly in the energy consumption data based on the upper bound or the lower bound or combination thereof.

6. The method of claim 1, further comprising
   forecasting future energy consumption associated with the building based on the time series model, the variable based degree day model, and weather forecast data.

7. The method of claim 1, wherein the multivariate regression models comprises:

$b_i = \beta_0 + \beta_1 x_{i1} + \beta_2 x_{i2} + \beta_3 x_{i3} + \ldots + e_i;$ $h_i = \beta_0 + \beta_1 x_{i1} + \beta_2 x_{i2} + \beta_3 x_{i3} + \ldots + e_i;$ and $c_i = \beta_0 + \beta_1 x_{i1} + \beta_2 x_{i2} + \beta_3 x_{i3} + \ldots + e_i,$ wherein i represents building index,
   $b_i$ is energy consumption attributed to base load associated with building i,
   $h_i$ is energy consumption coefficient attributed to heating said building i,
   $c_i$ is energy consumption coefficient attributed to cooling said building i,
   $\beta_0$ represents a constant value,
   $\beta$ represents a coefficient for each variable x associated with said building i,
   $e_i$ represents error terms associated with building i, and
   x represents a building characteristic of said building i.

8. The method of claim 1, wherein the time series model comprises:

$$\left(1 - \sum_{k}^{p} \phi_{ik} L^k\right)(1 - L)^d \varsigma_{it} = \left(1 + \sum_{k=1}^{q} \theta_{ik} L^k\right) \eta_{it},$$

modeling residuals via ARIMA where,
   $\varsigma_{it}$ is the residual of the error term after the seasonal factors are taken out;
   i is an index that represents a building,
   k is an index that represents number of lags,
   L is a lag operator;

p, d, q are orders of autoregressive, integrated, and moving average parts of the time series model, said p and q reflecting strength of temporal dependence, d represents type of trend, $\{\phi_{ik}, \theta_{ik}\}$ represent parameters of the autoregressive part and the moving average part of the ARIMA model, and $\{\eta_{it}\}$ are independently identically normally distributed.

9. A non-transitory machine-readable storage medium storing a program of instructions executable by a machine to perform a method of performing analysis of energy consumption for a portfolio of buildings using multi-step statistical modeling, the method comprising:

receiving energy consumption data associated with a building;

receiving building characteristic data associated with the building;

receiving building operation and activities data associated with the building;

receiving weather data;

fitting said energy consumption data, said building characteristic data, said building operation and activities data, and said weather data to generate a variable based degree day model:

determining a base load factor, a heating coefficient and a cooling coefficient associated with the building and an error term from the variable based degree day model;

generating a plurality of multivariate regression models based on the base load factor, the heating coefficient, the cooling coefficient and the building characteristic data;

generating a time series model for the error term to model seasonal factors which reflect monthly dependence on energy use and an auto-regressive integrated moving average model (ARIMA) which reflects temporal dependent patterns of the energy use;

generating a performance score associated with energy consumption for base load of the building, a performance score associated with energy consumption for cooling the building, or a performance score associated with energy consumption for heating the building, or combinations thereof, based on the generated variable based degree day model and the multivariate regression models, wherein the variable based degree day model comprises $y_{it} = b_i + c_i(T_t - T_i^0)^+ + h_i(T_i^0 - T_t)^+ + \epsilon_{it}$, wherein i is building index;
t is time index;
$y_{it}$ is energy consumption for building i at time t;
$b_i$ is building effect for base load;
$T_t$ is outside temperature and $T_i^0$ is building specific base temperature associated with building i;
$c_i$ is building effects for cooling coefficient;
$h_i$ is building effects for heating coefficient; and
$\epsilon_{it}$ is an error term that represents unaccountable energy consumption.

10. The non-transitory machine readable storage medium of claim 9, wherein the step of fitting is performed a plurality of times iteratively with a varying base building temperature data in each iteration, wherein a plurality of variable base degree day models are generated for the building, and wherein the variable base degree day model having the best fit is selected for determining the base load factor, the heating coefficient and the cooling coefficient associated with the building.

11. The non-transitory machine readable storage medium of claim 9, further including analyzing root cause for energy consumption based on one or more of the performance score associated with energy consumption for base load of the building, the performance score associated with energy consumption for cooling the building, or the performance score associated with energy consumption for heating the building, or combinations thereof.

12. The non-transitory machine readable storage medium of claim 9, further including determining an upper bound and a lower bound for a predicted energy consumption of the building from the time series model.

13. The non-transitory machine readable storage medium of claim 12, further including detecting an anomaly in the energy consumption data based on the upper bound or the lower bound or combination thereof.

14. The non-transitory machine readable storage medium of claim 9, further comprising forecasting future energy consumption associated with the building based on the time series model, the variable based degree day model, and weather forecast data.

15. The non-transitory machine readable storage medium of claim 9, wherein the multivariate regression models comprise:

$b_i = \beta_0 + \beta_1 x_{i1} + \beta_2 x_{i2} + \beta_3 x_{i3} + \ldots + e_i;$ $h_i = \beta_0 + \beta_1 x_{i1} + \beta_2 x_{i2} + \beta_3 x_{i3} + \ldots + e_i;$ and $c_i = \beta_0 + \beta_1 x_{i1} + \beta_2 x_{i2} + \beta_3 x_{i3} + \ldots + e_i,$ wherein i represents building index,
$b_i$ is energy consumption attributed to base load associated with building i,
$h_i$ is energy consumption coefficient attributed to heating said building i,
$c_i$ is energy consumption coefficient attributed to cooling said building i,
$\beta_0$ represents a constant value,
$\beta$ represents a coefficient for each variable x associated with said building i, and
x represents a building characteristic of said building i.

16. The non-transitory machine readable storage medium of claim 9, wherein the time series model comprises:

$$\left(1 - \sum_{k}^{p} \phi_{ik} L^k\right)(1-L)^d \varsigma_{it} = \left(1 + \sum_{k=1}^{q} \theta_{ik} L^k\right) \eta_{it},$$

modeling residuals via ARIMA where, $\varsigma_{it}$ is the residual of the error term after the seasonal factors are taken out;
i is an index that represents a building,
k is an index that represents number of lags,
L is a lag operator;
p, d, q are orders of autoregressive, integrated, and moving average parts of the time series model, said p and q reflecting strength of temporal dependence,
d represents type of trend,
$\{\phi_{ik}, \theta_{ik}\}$ represent parameters of the autoregressive part and the moving average part of the ARIMA model, and
$\{\eta_{it}\}$ are independently identically normally distributed.

17. A system for performing analysis of energy consumption for a portfolio of buildings using multi-step statistical modeling, comprising:

a processor;
a module operable to execute on the processor and further operable to receive energy consumption data associated with a building, building characteristic data associated with the building, building operation and activities data associated with the building, and weather data, the module further operable to fit said energy consumption data, said building characteristic data, said building operation and activities data, and said weather data to generate a variable based degree day model, the module further operable to determine a base load factor, a heating coefficient and a cooling coefficient associated with the building and an error term from the variable based degree day model, the module further operable to generate a plurality of multivariate regression models based on the base load factor, the heating coefficient, the cooling coefficient and the building characteristic data, the module further operable to generate a time series model for the error term to model seasonal factors which reflect monthly dependence on energy use and an auto-regressive integrated moving average model (ARIMA) which reflects temporal dependent patterns of the energy use, the module further operable to generate a performance score associated with energy consumption for base load of the building, a performance score associated with energy consumption for cooling the building, or a performance score associated with energy consumption for heating the building, or combinations thereof, based on the generated variable based degree day model and the multivariate regression models, wherein the variable based degree day model comprises $y_{it}=b_i+c_i(T_t-T_i^o)^+ +h_i(T_i^o-T_t)^+ +\epsilon_{it}$, wherein i is building index;
t is time index;
$y_{it}$ is energy consumption for building i at time t;
$b_i$ is building effect for base load;
$T_t$ is outside temperature and $T_t^o$ is building specific base temperature associated with building i;
$c_i$ is building effects for cooling coefficient;
$h_i$ is building effects for heating coefficient; and
$\epsilon_{it}$ is an error term that represents unaccountable energy consumption.

18. The system of claim 17, wherein the module fits said energy consumption data, said building characteristic data, said building operation and activities data, and said weather data to generate a variable based degree day model, a plurality of times iteratively with a varying base building temperature data in each iteration, wherein a plurality of variable base degree models are generated for the building, and wherein the variable base degree model having the best fit is selected for determining the base load factor, the heating coefficient and the cooling coefficient associated with the building.

19. The system of claim 17, wherein the module is further operable to analyze root cause for energy consumption based on one or more of the performance score associated with energy consumption for base load of the building, the performance score associated with energy consumption for cooling the building, or the performance score associated with energy consumption for heating the building, or combinations thereof.

20. The system of claim 17, wherein the module is further operable to determine an upper bound and a lower bound for a predicted energy consumption of the building from the time series model.

21. The system of claim 20, wherein the module is further operable to detect an anomaly in the energy consumption data based on the upper bound or the lower bound or combination thereof.

22. The system of claim 17, wherein the module is further operable to forecast future energy consumption associated with the building based on the time series model, the variable based degree day model, and weather forecast data.

* * * * *